(12) United States Patent
Tsou

(10) Patent No.: US 7,268,334 B2
(45) Date of Patent: Sep. 11, 2007

(54) IMAGE SENSOR DEVICE AND A METHOD FOR OUTPUTTING DIGITAL SIGNALS

(75) Inventor: Ming-Chieh Tsou, Taipei Hsien (TW)

(73) Assignee: Lite-On Semiconductor Corp., Hsin-Tien, Taipei Hsien (TW)

( * ) Notice: Subject to any disclaimer, the term of this patent is extended or adjusted under 35 U.S.C. 154(b) by 125 days.

(21) Appl. No.: 11/195,783

(22) Filed: Aug. 3, 2005

(65) Prior Publication Data

US 2007/0029461 A1   Feb. 8, 2007

(51) Int. Cl.
  *H01L 27/00*   (2006.01)
  *H01L 31/00*   (2006.01)
  *H04N 3/14*   (2006.01)
  *H04N 1/04*   (2006.01)
(52) U.S. Cl. .............................. 250/208.1; 250/214.1; 348/308; 348/311; 257/443; 358/482
(58) Field of Classification Search ............. 250/208.1, 250/214.1, 214 R; 348/71, 308, 143, 272, 348/294, 311, 312; 358/445, 474, 482, 483, 358/513, 530; 257/291, 443, 444
See application file for complete search history.

(56) References Cited

U.S. PATENT DOCUMENTS 6,466,256 B1 *   10/2002   Takahashi et al. ............. 348/71

2004/0095495 A1 *   5/2004   Inokuma et al. ............. 348/308
2004/0119821 A1 *   6/2004   Kawai ........................ 348/143

\* cited by examiner

*Primary Examiner*—Georgia Epps
*Assistant Examiner*—Don Williams
(74) *Attorney, Agent, or Firm*—Birch, Stewart, Kolasch & Birch, LLP

(57) ABSTRACT

An image sensor device for outputting digital signals and a method thereof are disclosed. The image sensor device has a sensor module, a photoelectric converter module, an encoder module and a decoder module integrated with each other. The digital signals are outputted by the photoelectric converter module, are transferred to the series outputs by the encoder module, and then the decoder module takes the place of the ADC for transferring the series outputs to parallel digital signal outputs. Hence the present invention improves the defects (such as transmission interference, transmission decay and power consumption) of the analog signal, and removes the ADC from the image sensor device for reducing production costs. Furthermore, the image sensor device has some advantages for providing good image quality, easy assembly and reducing both power consumption and cost.

18 Claims, 4 Drawing Sheets

IMAGE SENSOR DEVICE AND A METHOD FOR OUTPUTTING DIGITAL SIGNALS

BACKGROUND OF THE INVENTION

1. Field of the Invention

The present invention relates to an image sensor device and a method for outputting digital signals, and particularly relates to an image sensor device having a sensor module, a photoelectric converter module, an encoder module and a decoder module integrated with each other.

2. Description of the Related Art

A CIS (Contact Image Sensor) is a type of linear sensor. A CIS is also a photoelectrical element that is adapted to scan horizontal pictures or words into an electronic format for storing, displaying, processing or transmitting. The distinguishing feature of the CIS is its integrated design. Furthermore, not only is light and thin, but it can also be assembled easily thereby reducing the costs of production.

Because the CIS has some advantages, such as its small volume and low cost, the CIS is gradually adapted to a diverse range of products. It is very important for a CIS to be compatible with another production system, such as a scanner or a printer, thereby reducing its design time and cost.

In general, a CIS can transform light signals to readable electronic signals. In other words, a CIS can be adapted to any type of image processing apparatus, such as a scanner, a printer or a MFP (Multi-Function Product), for reading words, pictures or data.

The CIS of the related art is processed and transmitted by analog signals, and then an ADC (Analog-to-Digital Converter) of the CIS transfers the analog signals to digital signals in customer side. However, the transmission of the analog signals has some defects, such as transmission interference, transmission decay and its high power consumption.

SUMMARY OF THE INVENTION

The present invention provides an image sensor device and a method for outputting digital signals. The image sensor device has a sensor module, a photoelectric converter module, an encoder module and a decoder module integrated with each other. The digital signals are outputted by the photoelectric converter module, are then transferred to the series outputs by the encoder module, and finally the decoder module takes the place of the ADC for transferring the series outputs to parallel digital signal outputs. Hence the digital signals are transmitted and processed by the above modules, except the sensor module. Thus the defects of the analog signal are decreased.

A first aspect of the invention is an image sensor device for outputting digital signals. The image sensor device comprises a sensor module, a photoelectric converter module, an encoder module and a decoder module. Wherein the sensor module receives light to generate light signals; the photoelectric converter module communicates with the sensor module for transferring the light signals to digital signals; the encoder module communicates with the photoelectric converter module for transferring the digital signals to sequence outputs; and the decoder module communicates with the encoder module, for transferring the series outputs to parallel digital signal outputs.

A second aspect of the invention is a method for an image sensor device to output digital signals. The method comprises: receiving light to generate light signals by a sensor module; transferring the light signals to digital signals via a photoelectric converter module which communicates with the sensor module; transferring the digital signals to sequence outputs via an encoder module which communicates with the photoelectric converter module; and transferring the series outputs to parallel digital signal outputs by a decoder module which communicates with the encoder module.

A third aspect of the invention is an image sensor device for outputting digital signals. The image sensor device comprises a timing generator module, a sensor module, an analog-to-digital converter module, an encoder module and a decoder module. Wherein the sensor module communicates with the timing generator module for receiving light to generate light signals via the timing generator module; the analog-to-digital converter module communicates with the sensor module for transferring the light signals to digital signals; the encoder module communicates with the analog-to-digital converter for transferring the digital signals to sequence outputs; and the decoder module communicates with the encoder module for transferring the series outputs to parallel digital signal outputs.

A fourth aspect of the invention is a method for an image sensor device to output digital signals. The method comprises providing a timing generator module; receiving light to generate light signals by the timing generator module controlling a sensor module which communicates with the timing generator module; transferring the light signals to digital signals by an analog-to-digital converter module which communicates with the sensor module; transferring the digital signals to sequence outputs by an encoder module which communicates with the analog-to-digital converter; and transferring the series outputs to parallel digital signal outputs by a decoder module which communicates with the encoder module.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objectives and advantages of the present invention will be more readily understood from the following detailed description when read in conjunction with the appended drawings, in which.

DETAILED DESCRIPTION OF PREFERRED EMBODIMENTS

Figure 1:
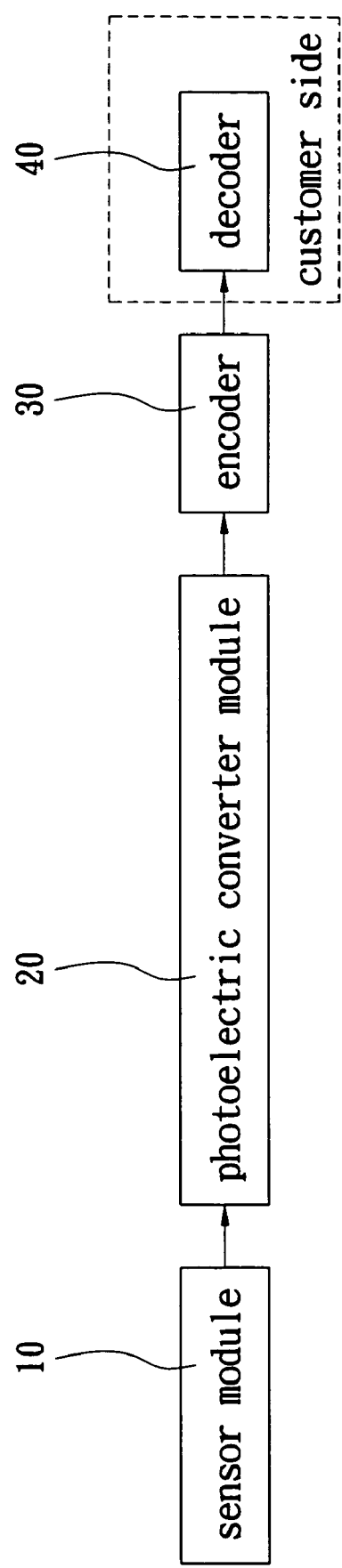
FIG. 1 is a function block of a sensor device according to the first embodiment (a decoder module is disposed on a customer side) of the present invention.

FIG. 1 shows a function block of a sensor device according to the first embodiment of the present invention. The image sensor device comprises a sensor module 10, a photoelectric converter module 20, an encoder module 30 and a decoder module 40, wherein the image sensor device is a CIS device.

The sensor module 10 is a CMOS (Complementary Metal-Oxide Semiconductor) sensor array or a CIS (Contact Image sensor) array. The sensor module 10 receives light to generate light signals. The photoelectric converter module 20 communicates with the sensor module 10 for transferring the light signals to digital signals, wherein the digital signals are digital pixels.

Moreover, the encoder module 30 communicates with the photoelectric converter module 20 for transferring the digital signals to sequence outputs, wherein the encoder module 30 is an encoder. The decoder module 40 communicates with the encoder module 30 for transferring the series outputs to parallel digital signal outputs, wherein the decoder module 40 is a decoder.

Figure 2:
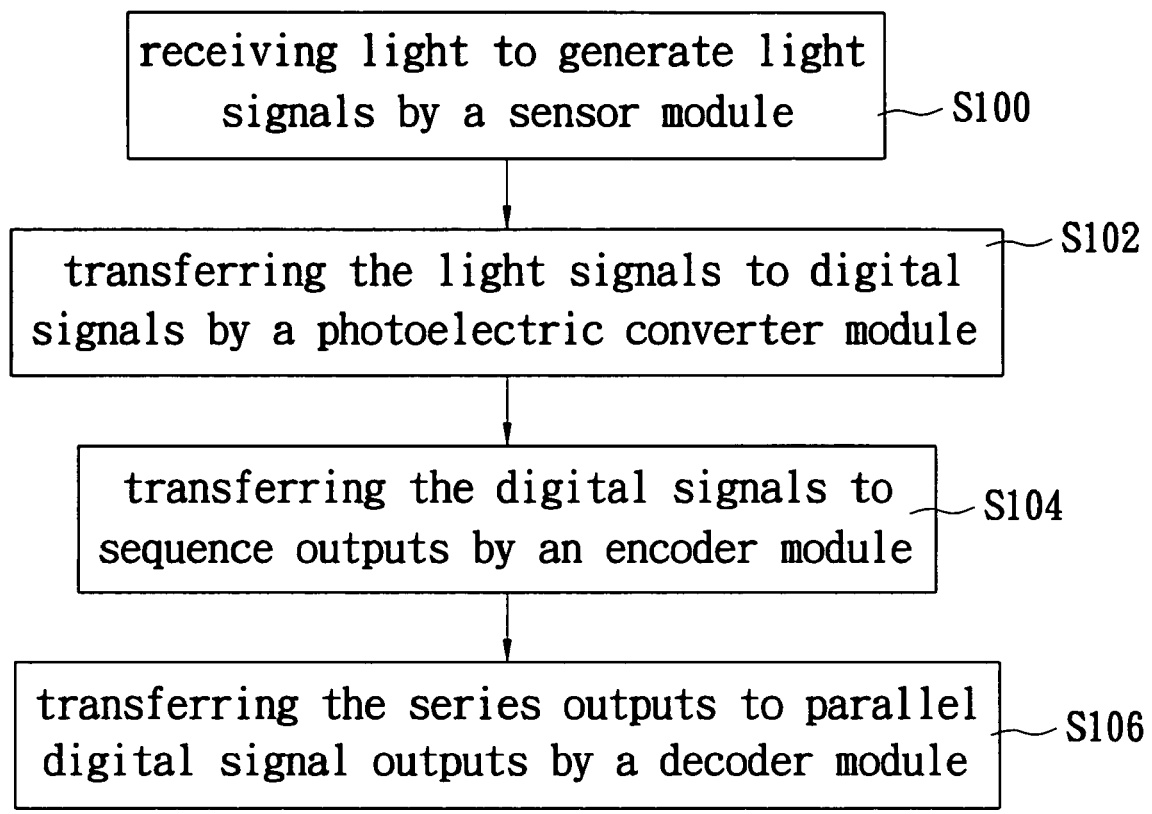
FIG. 2 is a flow chart of a sensor device according to the first embodiment of the present invention.

FIG. 2 shows a flow chart of a sensor device according to the first embodiment of the present invention. The method comprises the steps of: first, receiving light to generate light signals via a sensor module 10 (S106); next, transferring the light signals to digital signals via a photoelectric converter module 20 which communicates with the sensor module 10 (S102); then, transferring the digital signals to sequence outputs via an encoder module 30 which communicates with the photoelectric converter module 20 (S104); finally, transferring the series outputs to parallel digital signal outputs via a decoder module 40 which communicates with the encoder module 30 (S106).

Hence, the digital signals are outputted by the photoelectric converter module 20, and are transferred to the series outputs by the encoder module 30, and then the decoder module 40 takes the place of the ADC for transferring the series outputs to parallel digital signal outputs. Hence the digital signals are transmitted and processed by all the above modules, except the sensor module 10. Thus the defects of the analog signal are decreased.

Moreover, both the encoder module 30 and the decoder module 40 are used to modify digital signals, such as modifying the delayed digital signals, compensating for lost data, modifying distorted images and outputting the parallel digital signals, to take the place of the ADC to reduce the cost of the customer side.

Furthermore, the decoder module 40 can be disposed on a system module side (including the sensor module 10, the photoelectric converter module 20 and the encoder module 30) or the customer system side, wherein the image sensor device can be a scanner or a MFP. If the decoder module 40 is disposed on the system module side, the width of the bus must be increased to output the parallel signals; for example the bus needs 16 lines more than the original lines for 16 bits. Hence it is hard to design a system mechanism for the image sensor device, and the EMI (Electromagnetic Interference) effect is serious in the image sensor device. But if the decoder module 40 is disposed on the customer system side, the system module is connected with the decoder module 40 via only one communication line. Hence, it is more helpful to design the image sensor device.

Figure 3:
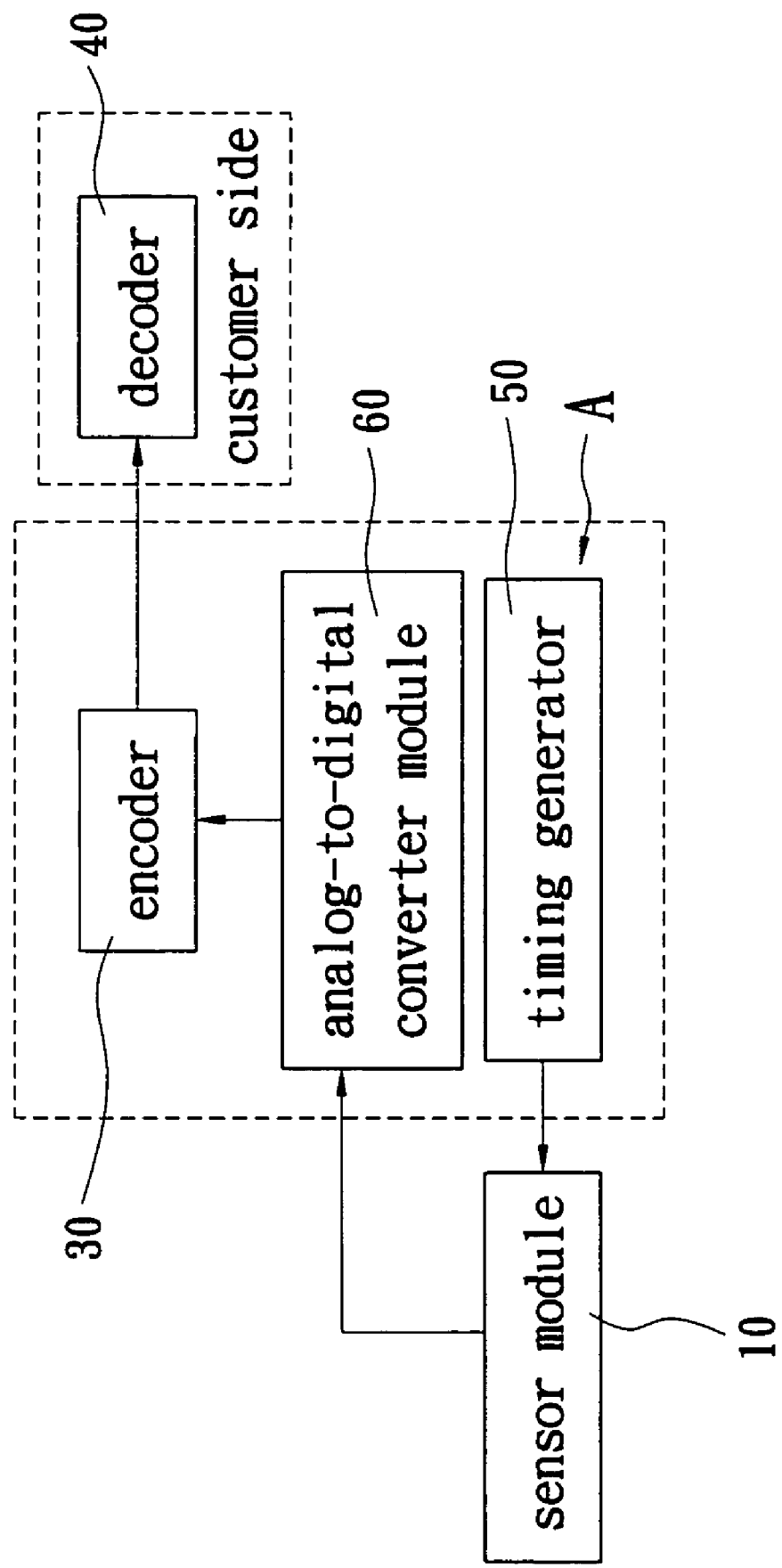
FIG. 3 is a function block of a sensor device according to the first embodiment (a decoder module is disposed on a customer side) of the present invention.

FIG. 3 shows a function block of a sensor device according to the first embodiment (a decoder module is disposed on a customer side) of the present invention. The image sensor device comprises a timing generator module 50, a sensor module 10, an analog-to-digital converter module 60, an encoder module 30 and a decoder module 40, wherein the sensor module 10 is a CCD (Charge Coupled Device) sensor array.

Moreover, the timing generator module 50 is a timing generator. The sensor module 10 communicates with the timing generator module 50 for receiving light to generate light signals via the timing generator module 50. The analog-to-digital converter module 60 communicates with the sensor module 10 for transferring the light signals into digital signals.

Furthermore, according to the second embodiment, the functions of both the encoder module 30 and the decoder module 40 are the same as in the first embodiment. In other words, the encoder module 30 communicates with the analog-to-digital converter 60 for transferring the digital signals to sequence outputs, and the decoder module 40 communicates with the encoder module 30 for transferring the series outputs to parallel digital signal outputs, wherein the decoder module 40 is disposed on the customer side.

Besides, the difference between the CCD and the CMOS is that the CCD sensor module and a digital controlling circuit cannot be integrated with each other into the same chip A. Hence, the CCD sensor module 10 must be controlled by the timing generator module 50; therefore the timing generator module 50, the analog-to-digital converter module 60 and the encoder module 30 all can be integrated into the same chip A.

Figure 4:
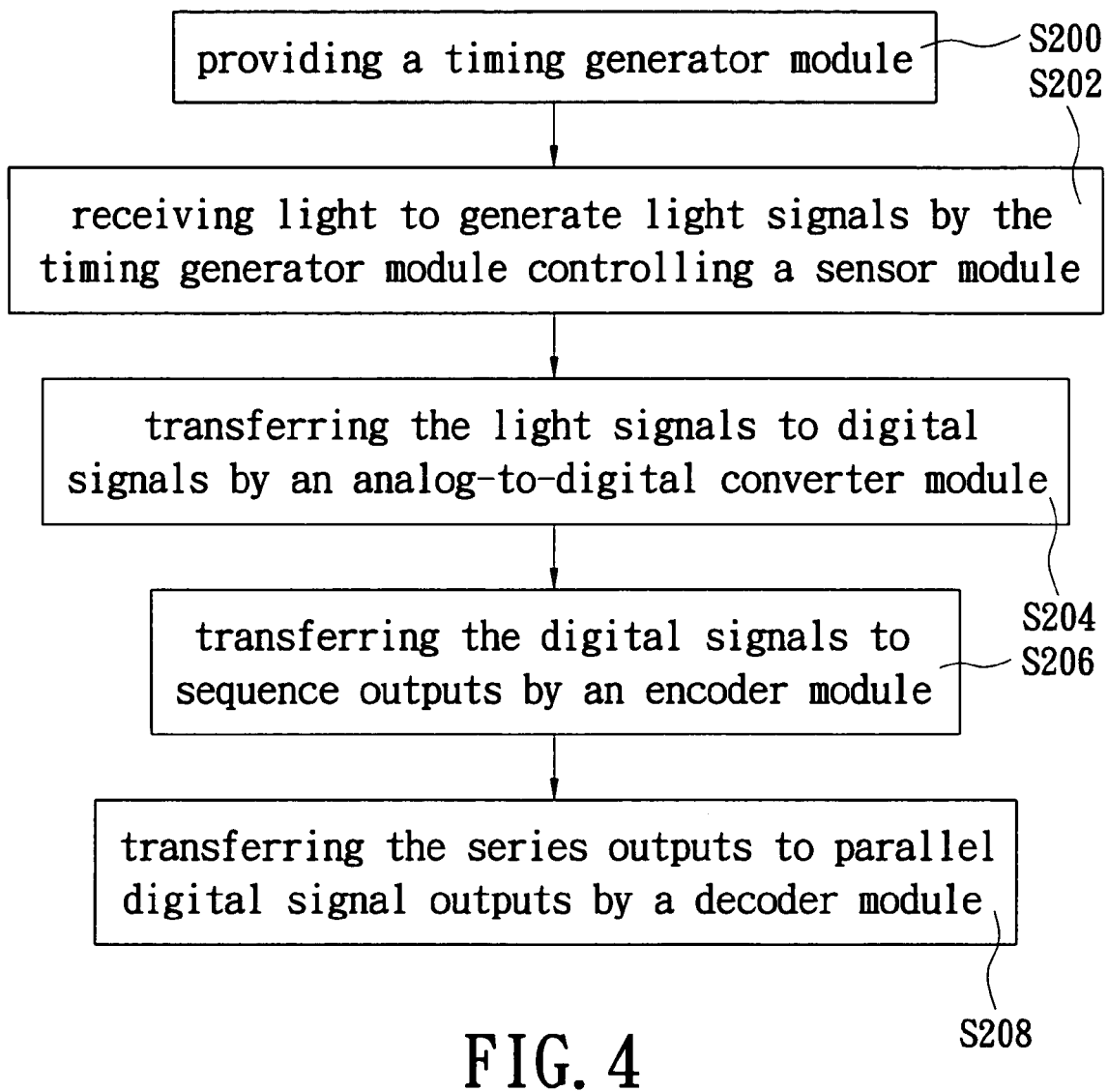
FIG. 4 is a flow chart of a sensor device according to the first embodiment of the present invention.

FIG. 4 shows a flow chart of a sensor device according to the first embodiment of the present invention. The method comprises the steps of: first, providing a timing generator module 50 (S200); next, receiving light to generate light signals via the timing generator module 50 controlling a sensor module 10 which communicates with the timing generator module 50 (S202); then transferring the light signals to digital signals via an analog-to-digital converter module 60 which communicates with the sensor module 10 (S204); afterward, transferring the digital signals to sequence outputs by an encoder module 30 which communicates with the analog-to-digital converter 60 (S206); finally, transferring the series outputs to parallel digital signal outputs via a decoder module 40 which communicates with the encoder module 30 (S208).

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An image sensor device for outputting digital signals, comprising:

a sensor module, for receiving light to generate light signals, the sensor module being a CMOS sensor array;

a photoelectric converter module communicating with the sensor module, for transferring the light signals to digital signals;

an encoder module communicating with the photoelectric converter module, for transferring the digital signals to sequence outputs; and a decoder module communicating with the encoder module, for transferring the series outputs to parallel digital signal outputs, wherein the decoder module is remotely disposed on a side of a user, wherein the sensor module, the photoelectric converter module and the encoder module are integrated into a chip.

2. The image sensor device as claimed in claim 1, wherein the digital signals are digital pixels.

3. The image sensor device as claimed in claim 1, wherein the encoder module is an encoder.

4. The image sensor device as claimed in claim 1, wherein the decoder module is a decoder.

5. A method for an image sensor device to output digital signals, comprising:
   providing a chip that includes a sensor module, a photoelectric converter module and an encoder module integrated therein;
   receiving light to generate light signals via the sensor module, the sensor module being a CMOS sensor array;
   transferring the light signals to digital signals via the photoelectric converter module which communicates with the sensor module;
   transferring the digital signals to sequence outputs via the encoder module which communicates with the photoelectric converter module; and transferring the series outputs to parallel digital signal outputs via a decoder module which communicates with the encoder module, wherein the decoder module is remotely disposed on a side of a user.

6. The method as claimed in claim 5, wherein the digital signals are digital pixels.

7. The method as claimed in claim 5, wherein the encoder module is an encoder.

8. The method as claimed in claim 5, wherein the decoder module is a decoder.

9. An image sensor device for outputting digital signals, comprising:
   a timing generator module;
   a sensor module communicating with the timing generator module, for receiving light to generate light signals via the timing generator module, the sensor module being a CMOS sensor array;
   an analog-to-digital converter module communicating with the sensor module, for transferring the light signals to digital signals;
   an encoder module communicating with the analog-to-digital converter, for transferring the digital signals to sequence outputs; and
   a decoder module communicating with the encoder module, for transferring the series outputs to parallel digital signal outputs, wherein the decoder module is remotely disposed on a side of a user,
   wherein the sensor module, the analog-to-digital converter module and the encoder module are integrated into a chip.

10. The image sensor device as claimed in claim 9, wherein the timing generator module is a timing generator.

11. The image sensor device as claimed in claim 9, wherein the encoder module is an encoder.

12. The image sensor device as claimed in claim 9, wherein the decoder module is a decoder.

13. The image sensor device as claimed in claim 9, wherein the timing generator module, the analog-to-digital converter module and the encoder module are integrated into a chip.

14. A method for an image sensor device to output digital signals, comprising:
   providing a chip that includes a sensor module, an analog-to-digital converter module and an encoder module integrated therein;
   providing a timing generator module;
   receiving light to generate light signals via the timing generator module controlling the sensor module which communicates with the timing generator module, the sensor module being a CMOS sensor array;
   transferring the light signals to digital signals via the analog-to-digital converter module which communicates with the sensor module;
   transferring the digital signals to sequence outputs via the encoder module which communicates with the analog-to-digital converter; and
   transferring the series outputs to parallel digital signal outputs via a decoder module which communicates with the encoder module, wherein the decoder module is remotely disposed on a side of a user.

15. The method as claimed in claim 14, wherein the timing generator module is a timing generator.

16. The method as claimed in claim 14, wherein the encoder module is an encoder.

17. The method as claimed in claim 14, wherein the decoder module is a decoder.

18. The method as claimed in claim 14, wherein the timing generator module, the analog-to-digital converter module and the encoder module are integrated into a chip.

* * * * *